Figure 1:
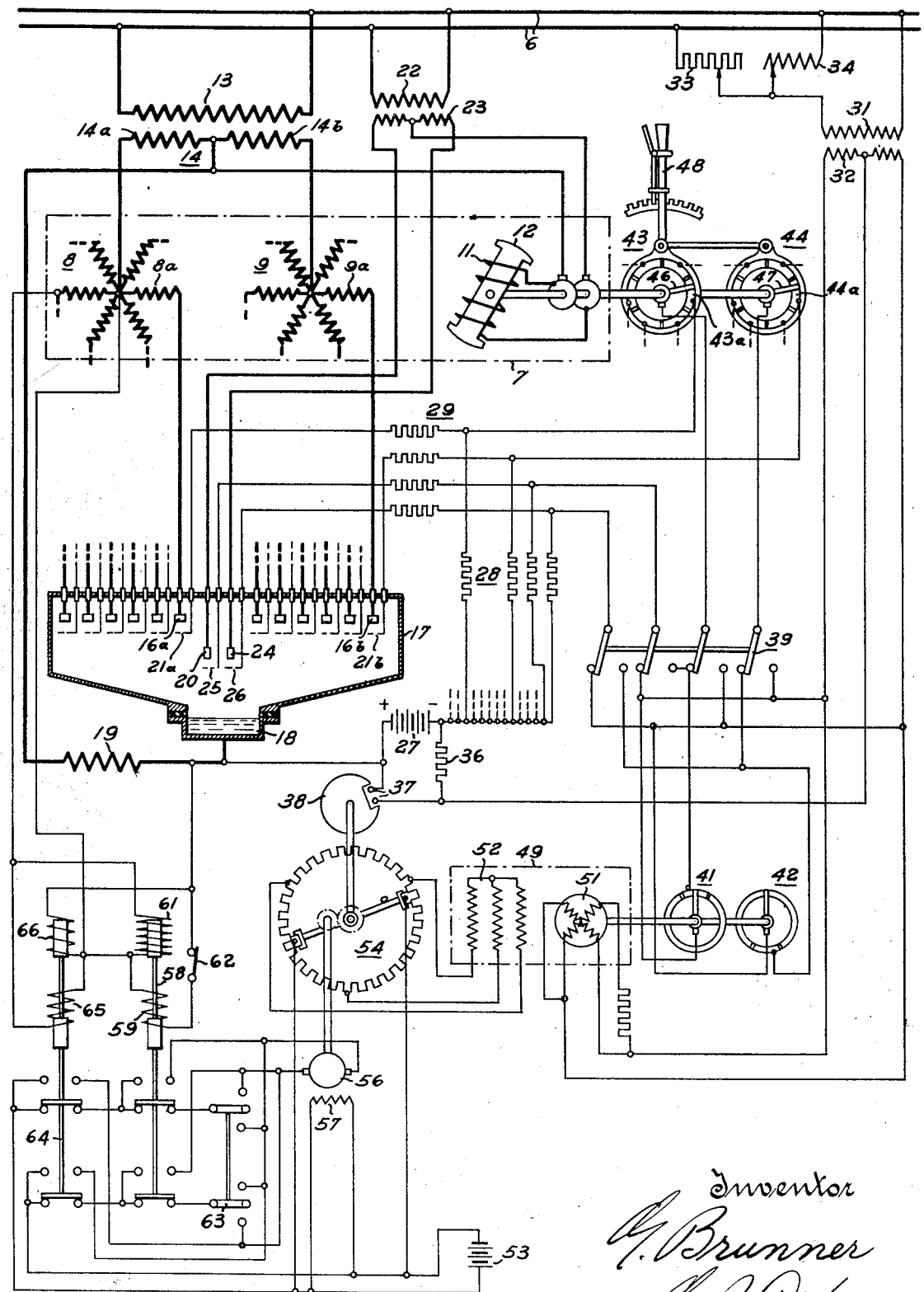

Dec. 18, 1934.  G. BRUNNER  1,984,915
MOTOR CONTROL SYSTEM
Filed June 16, 1933    2 Sheets-Sheet 1

Inventor
G. Brunner
by
Attorney

Dec. 18, 1934.    G. BRUNNER    1,984,915

MOTOR CONTROL SYSTEM

Filed June 16, 1933    2 Sheets-Sheet 2

Inventor
G. Brunner
by G. P. W. Wein
Attorney

Patented Dec. 18, 1934

1,984,915

UNITED STATES PATENT OFFICE 1,984,915

MOTOR CONTROL SYSTEM

Gustav Brunner, Baden, Switzerland, assignor to Aktiengesellschaft Brown Boveri & Cie, Baden, Switzerland, a joint-stock company of Switzerland Application June 16, 1933, Serial No. 676,029
In Germany June 22, 1932

12 Claims. (Cl. 172—274)

This invention relates to improvements in electric motor control systems and more particularly to the control of variable speed alternating current motors operable either as motors or as generators and in which the armature currents are commutated by means of electron discharge devices.

It is well known that an electric motor of the so-called synchronous type may be operated at continuously variable speeds by commutating the armature currents of the motor by means of suitable electron discharge devices provided with discharge controlling means to control the operation thereof. The discharge device or devices are then operable as an alternating current rectifier supplying pulsating current to the windings of the motor. By suitable adjustment of the control means of the discharge device, the motor may be made operable as a generator to return energy to the supply line. The discharge device then functions as a direct current inverter and the operation thereof must be accurately controlled as inverting operation of a discharge device is possible only under predetermined and clearly defined conditions. The times at which the flow of current is released through the successive anodes of the device must be selected within predetermined limits and are then preferably maintained invariable with respect to the voltage cycle of the supply line. The induced electromotive force of the armature must then not exceed a predetermined value and is preferably maintained within predetermined limits by automatic means. Means should also be provided to insure that the changeover from motoring to generating operation and vice versa be effected without disturbance.

It is therefore among the objects of the present invention to provide a control system for a variable speed alternating current motor in which the motor armature currents are commutated by means of an electron discharge device.

Another object of the present invention is to provide a control system for a variable speed alternating current motor by which the motor is operable to return energy to the supply line.

Another object of the present invention is to provide a control system for a variable speed alternating current motor by which the induced electromotive force of the motor is automatically maintained within predetermined limits.

Another object of the present invention is to provide a control system for a variable speed alternating current motor by which the motor is completely deenergized during changeover from motoring to generating operation and vice versa.

Figure 2:
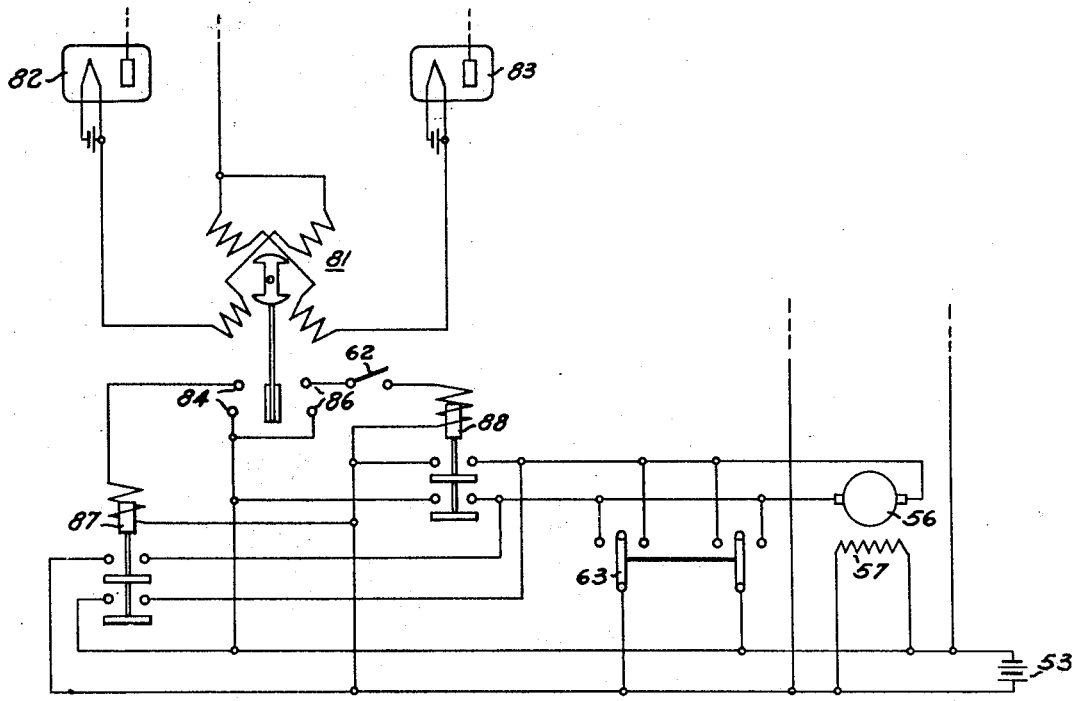
Figure 3:
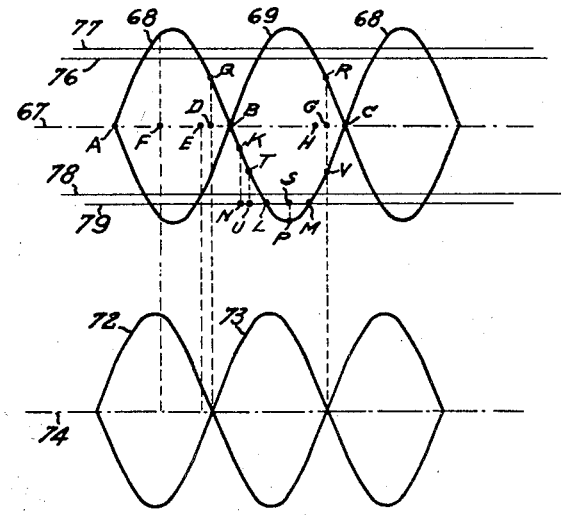

Objects and advantages other than those above set forth will be apparent from the following description when read in connection with the accompanying drawings in which:

Fig. 1 diagrammatically illustrates one embodiment of the present invention applied to the control of an electric motor of the shunt type in which the induced electromotive force of the motor is maintained within predetermined limits by means of relays;

Fig. 2 diagrammatically illustrates the modified portions of a modified embodiment of the present invention differing from the embodiment illustrated in Fig. 1 in the type of relay employed for controlling the induced electromotive force of the motor; and Fig. 3 is a diagram of some of the voltages of the circuits illustrated in Figs. 1 and 2.

Referring more particularly to the drawings by characters of reference, reference numeral 6 designates an alternating current supply line herein illustrated as a single phase line. It will be understood, however, that line 6 may be of any desired number of phases energized at any voltage of any frequency, and that the system herein described may be suitably modified for operation of lines other than single phase lines by suitable modification or duplication of elements described and illustrated. Line 6 supplies current to a variable speed alternating current motor generally designated by 7 which may be directly connected with line 6, but which is preferably connected therewith by means of a transformer. Motor 7 is provided with an armature winding comprising two similar portions 8 and 9 each comprising a plurality of angularly displaced portions such as 8a, 9a, etc. The field winding 11 of the motor is preferably mounted on the rotor 12 of the motor, windings 8 and 9 then being assembled in the stator thereof. Armature winding 8, 9 is preferably connected with line 6 by means of a transformer having a primary winding 13 and a secondary winding 14 comprising two portions 14a and 14b joined to form a midtap. The several portions of winding 8, 9 are connected with the anodes 16 of an electron discharge device generally designated 17 and having a cathode 18 connected with the midtap of winding 14 through a wave smoothing reactor 19. The potential of cathode 18 will be herein utilized as datum for potentials and all potentials will be referred thereto unless otherwise stated.

The operation of device 17 is controlled by means of a plurality of control electrodes 21 severally associated with the anodes 16. Device 17 is also provided with auxiliary anodes 20 and 24 provided with associated control electrodes 25 and 26 respectively which supply, to motor winding 11, current received from line 6 through a transformer having a primary winding 22 and a secondary winding 23. Control electrodes 21, 25 and 26 receive a negative potential from a battery 27 connected with cathode 18, such potential being applied to the control electrodes through resistances 28 and 29. The control electrodes also receive alternating control potentials from line 6 through a transformer having a primary winding 31 and a secondary winding 32 provided with a midtap. Winding 31 is preferably connected with line 6 through impedance means such as a resistance 33 and a reactor 34, which may be adjusted to vary the phase relation between the voltage of winding 32 and the voltage of line 6. The midtap of winding 32 is connected with cathode 18 through a resistance 36 and battery 27, and may also be connected directly with cathode 18 through contacts 37 upon bridging of such contacts by means of a drum 38. The connections between winding 32 and control electrodes 21, 25 and 26 are completed by means of a reversing switch 39 effecting such connections in one manner during motoring operation of motor 7 and in another manner during regenerating operation of such motor.

During motoring operation, switch 39 being in the position shown, winding 32 is connected directly with control electrodes 25 and 26 through resistances 29. Winding 32 is also then connected with control electrodes 21 through switches 41 and 42, operating in synchronism with the voltage of line 6, and through distributors 43 and 44, having the brushes 46 and 47 thereof actuated by the shaft of motor 7. Distributor 43 is provided with a plurality of conductive segments such as 43a severally connected with the control electrodes such as 21a controlling the flow of current through the several portions of winding 8. Distributor 44 is similarly provided with segments such as 44a connected with control electrodes such as 21b controlling the flow of current through the several portions of winding 9. The position of the segments of distributors 43 and 44 may be adjusted by means of a lever 48 to permit adjustment of the position of the neutral axis of winding 8, 9 with respect to the position of winding 11 and thereby to permit adjustment of the torque of the motor, of the direction of rotation thereof, and to permit changeover from motoring to regenerating operation.

During regenerative operation of motor 7, switch 39 is reversed to connect control electrodes 21 with winding 32 without employing switches 41 and 42, such switches then connecting control electrodes 25 and 26 with winding 32. Switches 41 and 42 are actuated by means of a synchronous motor 49 having a split phase armature 51 energized from winding 32. The field winding 52 of motor 49 is provided with a plurality of angularly displaced portions receiving current from a suitable source of direct current such as a battery 53. The distribution of current through the several portions of winding 52 is controlled by a rheostat 54 which permits to adjust such distribution of current to obtain any desired relation between the momentary position of armature 51 and the voltage cycle of line 6. Rheostat 54 and contact drum 38 are operated by the armature 56 of a direct current motor having a field winding 57 directly connected with battery 53. Armature 56 is energized from battery 53 to cause rotation of such armature in one direction by means of a relay 64 provided with an operating coil 65 connected across one of the portions of winding 8 and also provided with a second operating coil 66 connected across winding portion 14a. Coil 65 is thus responsive to the value of the induced electromotive force in the armature winding while coil 66 is energized in response to the voltage of line 6. The actions of such coils on relay 64 oppose each other so that relay 64 will operate in response to the difference between the line voltage and the induced electromotive force of the motor. In the present system such voltage and such electromotive force will generally be materially different for the reason that the several portions of the armature winding are only intermittently connected with the line and for the further reason that while the line voltage is sinusoidal, the voltage opposed thereto by the armature is substantially constant when field winding 11 receives a constant current. Such difference between the line voltage and the electromotive force of the armature will appear as a voltage drop in transformer 13, 14. Armature 56 may be connected with battery 53 to operate in the other direction by means of a second relay 58 having an operating coil 59 energized from winding portion 14a and a second operating coil 61 connected across a portion of winding 8. The connections and the numbers of turns of windings 59, 61, 65 and 66 are such that relay 64 will raise the armature thereof when the induced electromotive force of the motor exceeds a predetermined fraction of the voltage of line 6 while relay 58 will raise the armature thereof when the induced electromotive force of motor 7 is below a lesser fraction of the voltage of line 6. The operation of relay 58 may be prevented by disconnecting coil 59 by means of switch 62, and the operation of motor 56, 57 may then be controlled by means of a switch 63, provided that the armature of relay 64 be in the position shown.

As a result of the above connections, windings 8, 9 and 11 of the motor are connected with line 6 by means which include transformers 13, 14 and 22, 23. The flow of current through such windings is then controlled by means of discharge device 17. The means provided for the purpose of controlling the operation of device 17 comprise switches 41 and 42 and distributors 43 and 44. Such means are controlled by relays 64 and 58 and rheostat 54 in response to the relative values of the induced electromotive force of motor 7 and of the voltage of line 6 and are, therefore, controlled in response to an electrical condition of such motor or, more generally, in response to an operating condition of such motor. As will appear from a description of the operation of the system, relays 64 and 58 and rheostat 54 automatically control the induced electromotive force of the armature windings of motor 7 to maintain such electromotive force within predetermined limits. Distributors 43 and 44, which are actuated by the motor, control the operation of device 17 only to regulate the flow of current through the armature of the motor while switches 41 and 42, which are actuated in synchronism with the voltage of line 6, may regulate the flow of current either in the field winding or in the armature winding of the motor; in the latter case, such switches cooperate with distributors 43 and 44 to regulate the flow of current through the armature winding of the motor.

In operation, the system being connected as shown, motor 7 is operable as a motor due to the connections established by switch 39. Line 6 being energized, motor 49 rotates at synchronous speed so that switches 41 and 42 complete the connection of brushes 46 and 47 with winding 32 once during every cycle of the voltage of line 6. Control electrodes 25 and 26 are directly connected with winding 32 and receive alternating current voltages therefrom. Contact drum 38 being in the position shown, the voltage of battery 27 is impressed on all control electrodes, such voltage overcoming the voltage of winding 32 so that all control electrodes are continuously negative and prevent the flow of any current through device 17. Rheostat 54 is then in the position giving a maximum lag to the position of armature 51 of motor 49, with respect to the voltage cycle of line 6. The induced electromotive force of motor 7 is then zero so that relay 58 raises the armature thereof, thereby connecting armature 56 with battery 53. Armature 56 being thus energized moves the contact of rheostat 54 and contact drum 38. Contact drum 38 immediately bridges contacts 37, thereby directly connecting the midtap of winding 32 with cathode 18. Control electrodes 25 and 26 then receive only alternating currents from winding 32 at the full voltage of such winding, thereby releasing the flow of current through anodes 20 and 24.

Referring to the diagram of Fig. 3, curve 68 referred to a time axis 67 represents the voltage of the portion of winding 23 connected with anode 20 and also represents, at the same or at another scale, the voltage of winding portion 14a. Curve 69 then represents the voltage of the portion of winding 23 connected with anode 24 and also the voltage of winding portion 14b. Curve 72, which is displaced in phase with respect to curve 68, then represents the voltage received by control electrode 25 from winding 32, such curve being referred to another time axis 74 to clarify the drawings. The voltage received by control electrode 26 from winding 32 is then represented by curve 73. As may be seen from Fig. 3, anode 20 receives a voltage, represented by curve 68, which becomes positive when the associated control electrode 25 is already at a positive potential represented by an ordinate of curve 72. Similarly, anode 24 becomes positive when the associated control electrode 26 is already positive. Anode 20 therefore carries current during the time interval AB and anode 24 carries current during time interval BC, such currents combining at cathode 18 to supply, to winding 11, a direct current which is substantially free from pulsations as a result of the large inductance of winding 11 and of reactor 19. During motoring operation, such current is at the maximum value consistent with the voltage of winding 32 and with the resistance of winding 11, and is not regulated. Control electrodes 21 are then generally negatively energized from battery 27 through resistances 28 and 29. Assuming that rheostat 54 has not moved appreciably from the position shown, switch 41 will be operated in such a manner as to close the connection between brush 46 and winding 32 at the time D at which the voltage of winding 32 is zero. Movement of rheostat 54 causes the time of closure of such connection to occur earlier as at a time E. Brush 46 then receives a positive potential, which is the potential represented by the ordinate of curve 72 at time E, from winding 32 through switch 41 and switch 39. Such voltage is impressed through distributor 43 on one of the control electrodes controlling the flow of current through winding 8, such as 21a. The associated anode 16a then receiving, from winding portion 8a, a positive potential represented by the ordinate of curve 68, anode 16a will carry current during time interval EB. In a similar manner, switch 42 controls the connection of winding 32 with brush 47 of distributor 44; control electrode 21b becomes positively energized at the time H and releases the flow of current through the associated anode 16b during time interval HC. Such flow of current through anodes 16a and 16b is repeated during successive cycles of the voltage of line 6. The simultaneous flow of current through winding portions 8a, 9a and winding 11 produces a torque on rotor 12 causing such rotor to move in the corresponding direction. Brushes 46 and 47 are driven by the shaft of motor 7 and sequentially engage with the successive segments of distributors 43 and 44, thereby releasing the flow of current sequentially through the several anodes associated with windings 8 and 9. Each anode then carries current once during each revolution of rotor 12, such current flowing through each anode during a variable number of cycles of the voltage of line 6 in dependence upon the speed of rotor 12. Continued motion of motor armature 56 causes rheostat 54 to gradually vary the times of closure of switches 41 and 42 with respect to the voltage cycle of line 6 and thereby gradually advance the times at which the several control electrodes 21 release the flow of current through the associated anodes 16; such action gradually increases the average voltage under which current is supplied to armature 8, 9 by winding 14 and correspondingly increases the amount of current taken by such armature and the speed of the motor. The induced electromotive force in armature 8, 9 is proportional to the speed of the motor and to the value of the current flowing through winding 11 and, as the motor speed increases, such induced electromotive force increases until the value thereof is sufficient to cause relay 58 to release the armature thereof, thereby disconnecting armature 56 from battery 53. Rheostat 54 then remains in the position reached thereby and motor 7 then operates under substantially steady conditions. At any instant considered the portion of winding 8 carrying current receives, from winding 14, a voltage represented by the positive portion of curve 68 and the portion of winding 9 carrying current receives, from winding 14, a voltage which is represented by the positive portion of curve 69. The several portions of winding 8, 9 have induced therein electromotive forces which are alternating. As a result of the sequential connection of the successive portions of winding 8, 9 with winding 14 when winding 11 is in a predetermined angular relation with such portions, the induced electromotive force opposed to the flow of current from winding 14 by the successive portions of winding 8, 9 may however be considered as being a direct current voltage of substantially uniform value represented by line 76 in Fig. 3. The flow of current occurring through the active portion of winding 8 is then released by the associated control electrode 21 at a time such as time F and continues until the voltage represented by curve 68 becomes smaller than the induced electromotive force of the armature. The value of such induced electromotive force at the time at which relay 58 releases the armature thereof is represented in Fig. 3 by line 76.

Assuming that, for any reason such as the decrease of the load of motor 7, the speed thereof increases so that the induced electromotive force of armature 8, 9 reaches a higher value represented by curve 77, relay 64 raises the armature thereof and connects armature 56 with battery 53 in a manner opposite to that above considered, thereby causing armature 56 to rotate in a manner such as to return rheostat 54 towards the position shown in the drawings. Armature 51 therefore lags and switches 41 and 42 complete the connection of the control electrodes 21 at later instants of the voltage cycle of line 6. The average voltage under which current is transmitted from winding 14 to winding 8, 9 is thereby reduced, the flow of current through such winding decreases and the speed of the motor decreases, thereby causing the induced electromotive force of winding 8, 9 to decrease below the value represented by line 77, and relay 64 returns to the position shown. Armature 56 then stops and motor 7 continues to operate with an induced electromotive force intermediate the values represented by lines 76 and 77.

When it is desired to operate motor 7 as a generator after a period of motoring operation, switch 62 is opened thereby compelling relay 58 to remain in the position shown. Armature 56 may then be energized by means of switch 63 to return rheostat 54 and contact drum 38 to the position shown. Upon opening of contacts 37, all control electrodes of device 17 are negatively energized from battery 27 and all flow of current through device 17 is interrupted. Switch 39 is then reversed and lever 48 is moved to adjust distributors 43 and 44 to a position substantially 180 electrical degrees from the position of such distributors during motoring operation. Due to the motion of lever 48, distributors 43 and 44 will then release the flow of current through portions of winding 8, 9 in which the induced electromotive force is reversed with respect to the induced electromotive force present in the active portions of such winding during motoring operation. As a result of the reversal of switch 39, brush 46 receives a voltage from winding 32 which voltage is represented by curve 73 and brush 47 receives a voltage represented by curve 72. Upon closure of switch 62, relay 58 raises the armature thereof and connects armature 56 in the same manner as upon starting of the motoring operation. Drum 38 bridges contacts 37, and control electrode 25 receives the positive potential represented by curve 72 at a time such as time E, thereby releasing the flow of current through the associated anode 20 during interval EB. In a similar manner, control electrode 26 releases the flow of current through anode 24 during time interval HC. The flow of current through such anodes combines at cathode 18 into a current supplying winding 11, such current being, however, of a very low intensity compared with the intensity of such current during motoring operation. Upon bridging of contacts 37, brush 46 is directly connected with winding 32 to receive current therefrom and the particular control electrode, then energized from brush 46 through a segment of distributor 43 receives a potential represented by curve 73. Such potential becomes positive at time D thereby releasing the flow of current through the associated anode at such time under a decreasing positive voltage DQ. In a similar manner, brush 47 impresses upon one of the control electrodes associated with winding 9 the potential represented by curve 72, which potential becomes positive at time G and releases the flow of current through the associated anode operating at such time under a decreasing positive voltage GR. The anode starting to carry current at time D then continues to carry such current until time G, at which time the current is transferred from such anode to the anode then starting to carry current; such transfer takes place during a time interval of variable length which must however be smaller than GC.

The process of operation of device 17 during such regenerating operation will be better understood if it is considered that device 17 is then inverting a direct current received from the successive portions of winding 8, 9, into alternating current flowing through winding 14 and winding 13 to line 6. In the usual type of inverting system, the source of direct current is generally inserted between cathode 18 and the midtap of winding 14; in the present embodiment winding 8, 9 supplies pulsating currents which combine at cathode 18 to form a direct current, so that the voltage and current relations in the system will be substantially the same as if a source of direct current was used between cathode 18 and the midtap of winding 14. The induced electromotive force of winding 8, 9 is then equivalent to the voltage of such source represented by a line such as 79 in Fig. 3. It is generally considered that, in such an inverting system, an anode supplying current against an alternating voltage represented by curve 68 is to begin to carry current at a point of curve 68 comprised between the intersection L of curve 68 and line 79 and a particular point K of curve 68. Such point K is defined by the condition that the area KLN in Fig. 3 is equal to the area LSMP comprised between curve 68 and line 79. It may be shown that such geometrical condition results from the fact that, after the flow of current is initiated through the anode at a point T, such flow of current does not terminate at point L at which the voltage of the direct current source becomes smaller than the voltage of the alternating current line, such flow of current continuing to dissipate the energy stored in the inductive portions of the circuit until time represented by point P for which the area LSP is equal to the area TUL. But time P must be prior to time M because, if the flow of current through the anode is not terminated at point M, such flow of current will be reinforced at such time as the voltage of the direct current source is then again greater than the voltage of the alternating current line, and such flow of current is then beyond control.

Flow of current over the descending branch of curve 68 permits the transfer of only a limited amount of energy, such transfer being effected at a low power factor as the flow of current is not in phase with the voltage of the alternating current line. It is therefore preferable to release the flow of current through the anode at a time D at which the voltage of the alternating current line is still positive and of decreasing value. Such flow of current will then continue past time M and will no longer be extinguished by natural decay of the current through such anode. At time G, however, the flow of current is released to an anode associated with winding 9 and receiving, from the line 6, a voltage GR. At such time the voltage received from the line by the first anode considered is a negative voltage GV so that the flow of current through the first anode considered tends to cease immediately and tends to continue only through the anode released at time G. It is only necessary then that the magnetic energy stored in the circuit be entirely dissipated through the circuits of such two anodes not later than at time C, at which time the first anode becomes positive with respect to the second anode and the flow of current could otherwise no longer be controlled. Such method of control permits the flow of a considerably larger amount of energy and such flow, occurring in substantially phase coincidence with the voltage of line 6, is effected at a much higher power factor.

If the flow of such current is controlled by adjusting the times of energization of the control electrodes 21 of device 17 and if it is desired to initiate the regenerating operation without excessive current surges, the times at which brush 46 applies a positive voltage on the associated control electrodes must be first adjusted at time L and gradually advanced to time K and thereafter suddenly advanced to time B from which time they may be advanced towards time Q. The time interval BK cannot be utilized as the flow of current cannot be controlled when initiated during such interval by either of the two methods outlined above. Such a discontinuous control of the energization of the control electrodes is undesirable and, in the present embodiment, it was therefore preferred to energize the control electrodes at fixed times D and G respectively, and to adjust the current intensity through winding 11 to control the flow of energy returned to line 6. During such regenerating operation, however, the induced electromotive force of winding 8, 9 must not exceed a predetermined limit in order that the transfer of current from one anode to the other may be completed at times B and C during each cycle of the voltage of line 6. To obtain such effect the value of the current flowing through winding 11 is controlled by means of relay coil 65. Assuming that, for any reason, such induced electromotive force increases beyond the value represented by line 79 in Fig. 3, relay 64 raises the armature thereof and energizes armature 56 to return rheostat 54 towards the position shown in the drawings. Such movement of rheostat 54 causes switches 41 and 42 to lag, thereby retarding the times of release of the flow of current through anodes 20 and 24; the flow of current through winding 11 then decreases, thereby reducing the induced electromotive force of motor 7 below the value represented by line 79. Relay 64 then returns to the position shown and rheostat 54 remains in the position which such rheostat has reached at such time. To permit the transfer of a maximum amount of energy to line 6, it is desirable to maintain the induced electromotive force of motor 7 at as high a value as possible consistent with proper operation of device 17, such result being obtained by means of relay 58 which causes the flow of current through winding 11 to be increased when the induced electromotive force of motor 7 decreases below a value represented by line 78 in Fig. 3.

In the embodiment partially illustrated in Fig. 2, the line voltage and the induced electromotive force of motor 7 are compared by means of a single relay 81 provided with a pair of stationary coils energized from a portion of winding 8 through a rectifying device 82, and with another pair of stationary coils angularly displaced with respect to the first pair of coils and receiving current from winding portion 14a through a rectifying device 83. Relay 81 is provided with an armature of magnetic material which takes a position depending upon the relative values of the currents flowing through the several coils of the relay. When the induced electromotive force of motor 7 increases above a predetermined fraction of the voltage of line 6, the armature of relay 81 is moved in one direction a predetermined extent and closes contacts 84, thereby connecting the coil of a relay 87 with battery 53. Relay 87 controls armature 56 in the same manner as relay 64 in the embodiment illustrated in Fig. 1. If the induced electromotive force of motor 7 decreases below a predetermined value relative to the voltage of line 6, the armature of relay 81 closes contacts 86 connecting the coil of a relay 88 with battery 53. Relay 88 controls the operation of armature 56 in the same manner as relay 58 in the embodiment illustrated in Fig. 1. Such relay may be maintained inoperative by opening switch 62 in the connection of the coil thereof and armature 56 then may again be operated by hand by means of switch 63. The operation of the present embodiment differs from the operation of the embodiment illustrated in Fig. 1 only to the extent resulting from the detail modification above described and therefore needs not be further described.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a motor control system, an alternating current supply line, a motor operable either as a motor or as a generator and having an armature winding and a field winding, means for connecting said windings with said line, an electron discharge device connected with said windings and controlling the flow of current therethrough, means actuated by said motor for controlling the operation of said device to regulate the flow of current through said armature winding, and means actuated in synchronism with the voltage of said line for controlling the operation of said device to regulate the flow of current through either of said windings.

2. In a motor control system, an alternating current supply line, a motor operable either as a motor or as a generator and having an armature winding and a field winding, means for connecting said windings with said line, an electron discharge device connected with said windings and controlling the flow of curret therethrough, means actuated by said motor for controlling the operation of said device, and means actuated in synchronism with the voltage of said line and cooperating with the second said means to regulate the flow of current through said armature winding.

3. In a motor control system, an alternating current supply line, a motor operable either as a motor or as a generator and having an armature winding and a field winding, means for connecting said windings with said line, an electron discharge device connected with said windings and controlling the flow of current therethrough, means actuated by said motor for controlling the operation of said device to regulate the flow of current through said armature winding, and means actuated in synchronism with the voltage of said line for controlling the operation of said device to regulate the flow of current through said field winding.

4. In a motor control system, an alternating current supply line, a motor operable either as a motor or as a generator and having an armature winding and a field winding, means for connecting said windings with said line, an electron discharge device connected with said windings and controlling the flow of current therethrough, means actuated by said motor for controlling the operation of said device to regulate the flow of current through said armature winding, means actuated in synchronism with the voltage of said line for controlling the operation of said device to regulate the flow of current through either of said windings, and means responsive to the relative values of the voltage of said line and of the induced electromotive force of said armature winding for controlling the last said means.

5. In a motor control system, an alternating current supply line, a motor operable either as a motor or as a generator and having an armature winding and a field winding, means for connecting said windings with said line, an electron discharge device connected with said windings and controlling the flow of current therethrough, means actuated by said motor for controlling the operation of said device, means actuated in synchronism with the voltage of said line and cooperating with the second said means to regulate the flow of current through said armature winding, and means responsive to the relative values of the voltage of said line and of the induced electromotive force of said armature winding for controlling the last said means.

6. In a motor control system, an alternating current supply line, a motor operable either as a motor or as a generator and having an armature winding and a field winding, means for connecting said windings with said line, an electron discharge device connected with said windings and controlling the flow of current therethrough, means actuated by said motor for controlling the operation of said device to regulate the flow of current through said armature winding, means actuated in synchronism with the voltage of said line for controlling the operation of said device to regulate the flow of current through said field winding, and means responsive to the relative values of the voltage of said line and of the induced electromotive force of said armature winding for controlling the last said means.

7. In a motor control system, an alternating current supply line, a motor operable either as a motor or as a generator and having an armature winding and a field winding, means for connecting said windings with said line, an electron discharge device connected with said windings and controlling the flow of current therethrough, means actuated by said motor for controlling the operation of said device to regulate the flow of current through said armature winding, means actuated in synchronism with the voltage of said line for controlling the operation of said device to regulate the flow of current through said field winding, and means controlling the last said means for maintaining the induced electromotive force of said armature winding within predetermined limits.

8. In a system for converting direct current into single phase alternating current by means comprising anodes of an electron discharge device, the method of releasing the flow of current through one of said anodes when such anode receives an alternating voltage of positive sign and decreasing in magnitude, and of interrupting the flow of current through such anode when the voltage thereof has first become increasingly negative and thereafter becomes decreasingly negative, such interruption being effected by the release of a flow of current through another of said anodes then receiving an alternating voltage of positive sign and decreasing in magnitude.

9. In a system for controlling an alternating current dynamo electric machine operable as a generator for supplying current to a line and controlled by means comprising an electron discharge device, the method of controlling the operation of the machine comprising the releasing of the flow of currents generated in the armature of said machine through the anodes of the device at invariable instants with respect to the voltage wave of the line, and of automatically controlling the excitation of the field of said machine to maintain the induced electromotive force of the armature thereof within predetermined limits.

10. In combination with a dynamo electric machine having stator and rotor windings supplied with alternating current from an alternating current line, and an electron discharge device comprising a cathode and a plurality of anodes connecting said line with one of said windings and having control electrodes severally associated with said anodes for controlling the initiation of flow of current through the latter, of means actuated by said machine and means actuated in synchronism with the voltage of said line conjointly operable to continually impress potential supplied from said line on said control electrodes of such sign and magnitude and during such recurring periods as to control the moments of initiation of flow of current sequentially through said anodes, and means responsive to the relative values of the voltage of said line and of the induced electromotive force of said one of said windings for controlling the second said means in such sense as to thereby vary the said moments of initiation of flow of current through said anodes relative to the voltage cycle of said line.

11. In combination with a dynamo electric machine having a field excitation winding and an armature winding divided into two portions each comprising a plurality of phase displaced sections supplied with current from an alternating current line, and an electron discharge device comprising a cathode and a plurality of anodes severally connecting said sections with said line, and a plurality of control electrodes severally associated with said anodes for controlling the initiation of flow of current through the latter, of means actuated by said machine and means actuated in synchronism with the voltage of said line conjointly operable to continually impress potential supplied from said line on said control electrodes of such sign and magnitude and during such recurring periods as to control the moments of initiation of flow of current alternately and sequentially through the sections of the respective portions of said armature winding, and means responsive to the relative values of the voltage of said line and of the induced electromotive force of said armature winding for controlling the second said means in such sense as to thereby vary the said moments of initiation of flow of current through said anodes relative to the voltage of said line.

12. In combination with a dynamo electric machine operable either as a motor or as a generator comprising an armature winding and a field excitation winding, and means connecting said windings and an alternating current line, of an electron discharge device comprising electrodes connected with said windings and controlling the flow of current therethrough, means actuated by said machine for controlling the flow of current through said armature winding when operating either as a motor or as a generator, means actuated in synchronism with the voltage of said line for controlling the flow of current through said field winding during operation of said machine as a generator, the first and second said means being conjointly operable to control the flow of current through said armature winding during operation of said machine as a generator, and means responsive to the relative values of the voltage of said line and of the induced electromotive force of said armature winding for controlling the second said means.

GUSTAV BRUNNER.